(12) United States Patent
Srinivasaraju

(10) Patent No.: US 12,041,559 B2
(45) Date of Patent: Jul. 16, 2024

(54) CONTROLLING RADIO FREQUENCY EMISSIONS IN CELLULAR SYSTEM

(71) Applicant: Nokia Solutions and Networks Oy, Espoo (FI)

(72) Inventor: Srilakshmi Srinivasaraju, Bangalore (IN)

(*) Notice: Subject to any disclaimer, the term of this patent is extended or adjusted under 35 U.S.C. 154(b) by 232 days.

(21) Appl. No.: 17/643,563

(22) Filed: Dec. 9, 2021

(65) Prior Publication Data

US 2022/0286979 A1 Sep. 8, 2022

(30) Foreign Application Priority Data

Mar. 4, 2021 (FI) .................................... 20215243

(51) Int. Cl.
*H04W 52/20* (2009.01)
*H04W 52/36* (2009.01)

(52) U.S. Cl.
CPC ....... *H04W 52/367* (2013.01); *H04W 52/365* (2013.01)

(58) Field of Classification Search
CPC . H04W 52/367; H04W 52/365; H04W 52/36; H04L 1/0026
See application file for complete search history.

(56) References Cited

U.S. PATENT DOCUMENTS

| 7,376,074 | B2* | 5/2008 | Jung | H04L 27/2621 370/208 |
|---|---|---|---|---|
| 11,184,835 | B2* | 11/2021 | Jayawickrama | H04W 72/541 |
| 11,234,247 | B2* | 1/2022 | Mueck | H04W 52/243 |
| 2003/0202460 | A1* | 10/2003 | Jung | H04L 27/2621 370/480 |
| 2020/0128472 | A1* | 4/2020 | Jayawickrama | H04W 72/541 |
| 2020/0236685 | A1* | 7/2020 | Mueck | H04W 52/243 |
| 2020/0236719 | A1* | 7/2020 | Kim | H04W 52/50 |
| 2022/0225238 | A1* | 7/2022 | Wigren | H04W 52/40 |

FOREIGN PATENT DOCUMENTS

EP 3300436 A1 3/2018
WO WO-2020222682 A1 11/2020

* cited by examiner

*Primary Examiner* — Hai V Nguyen
(74) *Attorney, Agent, or Firm* — John A. Garrity

(57) ABSTRACT

This document discloses a solution for controlling radio emissions in cells of a cellular communication system. According to an aspect, a method includes determining a set of cells having a spatially overlapping coverage area in a sector, wherein the set of cells includes at least a first cell and a second cell; determining a maximum total radiation level for the sector; determining a priority of each cell in the set of cells such that the first cell is prioritized over the second cell; and allocating, on the basis of the maximum total radiation level and said priorities, to each cell in the set of cells a parameter indicating a maximum radiation level in the respective cell, wherein said allocating is performed such that a smaller power reduction from a maximum transmission power is allowed for the first cell than for the second cell.

15 Claims, 5 Drawing Sheets

CONTROLLING RADIO FREQUENCY EMISSIONS IN CELLULAR SYSTEM

FIELD

Various embodiments described herein relate to the field of wireless communications and, particularly, to controlling radio frequency emissions in cells of a cellular communication system.

BACKGROUND

With the constant development of new radio access technologies on top of existing radio access technologies, radio emissions caused by various radio transmitters are bound to increase. In order to limit the amount of radio emissions, regulations to the radio emissions have been designed. An operator of a cellular communication system is given a parameter defining a maximum transmitted power or effective (isotropic) radiated power (EIRP) per spatial area, e.g. a cell or a sector of a cellular system.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for controlling radio emissions in cells of a cellular communication system, comprising: at least one processor; and at least one memory including computer program code, wherein the at least one memory and computer program code are configured to, with the at least one processor, cause the apparatus to perform the following: determining a set of cells having a spatially overlapping coverage area in a sector, wherein the set of cells comprises at least a first cell and a second cell; determining a maximum total radiation level for the sector; determining a priority of each cell in the set of cells such that the first cell is prioritized over the second cell; and allocating, on the basis of the maximum total radiation level and said priorities, to each cell in the set of cells a parameter indicating a maximum radiation level in the respective cell, wherein said allocating is performed such that a smaller power reduction from a maximum transmission power is allowed for the first cell than for the second cell.

In an embodiment, the at least one memory and computer program code are further configured to, with the at least one processor, cause the apparatus to determine a current radiation level of each cell in the set of cells, and to perform said allocating further on the basis of the current radiation level of said each cell.

In an embodiment, each cell in the set of cells comprises a plurality of segments, and the at least one memory and computer program code are further configured to, with the at least one processor, cause the apparatus to determine the current radiation level per segment and to select, as the current radiation level of each cell, a current radiation level of a segment having the highest radiation level in the respective cell.

In an embodiment, the at least one memory and computer program code are further configured to, with the at least one processor, cause the apparatus to determine a headroom between a sum of the current radiation levels and the maximum total radiation level, to allocate the headroom to the cells in the set of cells according to the determined current radiation levels and the prioritization, and to adjust the parameters of the cells in the set of cells according to the allocation.

In an embodiment, the current radiation level is a measured effective radiated power, and wherein the parameter is a power reduction factor that reduces a maximum transmission power in a cell.

In an embodiment, the at least one memory and computer program code are configured to, with the at least one processor, cause the apparatus to allocate the maximum total radiation level to the cells in the set of cells when allocating the parameters, and to rebalance the allocation of the maximum total radiation level amongst the cells in the set of cells by changing the parameter of at least two cells in the set of cells.

In an embodiment, the first cell is configured to operate according to a first radio access technology and the second cell is configured to operate according to a second radio access technology different from the first radio access technology, and wherein the prioritization is based on a radio access technology such that the first radio access technology providing a higher quality-of-experience or a higher quality-of-service is prioritized over the second radio access technology providing a lower quality-of-experience or a lower quality-of-service.

In an embodiment, the first cell is a primary cell of the first radio access technology and the second cell is a secondary cell of the first radio access technology, and wherein the at least one primary cell is prioritized over the at least one secondary cell.

According to an aspect, there is provided a computer-implemented method for controlling radio emissions in cells of a cellular communication system, comprising: determining a set of cells having a spatially overlapping coverage area in a sector, wherein the set of cells comprises at least a first cell and a second cell; determining a maximum total radiation level for the sector; determining a priority of each cell in the set of cells such that the first cell is prioritized over the second cell; and allocating, on the basis of the maximum total radiation level and said priorities, to each cell in the set of cells a parameter indicating a maximum radiation level in the respective cell, wherein said allocating is performed such that a smaller power reduction from a maximum transmission power is allowed for the first cell than for the second cell.

In an embodiment, the method further comprises determining a current radiation level of each cell in the set of cells and performing said allocating further on the basis of the current radiation level of said each cell.

In an embodiment, each cell in the set of cells comprises a plurality of segments, and the method further comprises determining the current radiation level per segment and selecting, as the current radiation level of each cell, a current radiation level of a segment having the highest radiation level in the respective cell.

In an embodiment, the method further comprises determining a headroom between a sum of the current radiation levels and the maximum total radiation level, allocating the headroom to the cells in the set of cells according to the determined current radiation levels and the prioritization, and adjusting the parameters of the cells in the set of cells according to the allocation.

In an embodiment, the current radiation level is a measured effective radiated power, and the parameter is a power reduction factor that reduces a maximum transmission power in a cell.

In an embodiment, the maximum total radiation level is allocated to the cells in the set of cells when allocating the parameters, the method further comprising rebalancing the allocation of the maximum total radiation level amongst the cells in the set of cells by changing the parameter of at least two cells in the set of cells.

According to an aspect, there is provided a computer program product embodied on a computer-readable medium and comprising a computer program code readable by a computer, wherein the computer program code configures the computer to carry out a computer process for controlling radio emissions in cells of a cellular communication system, comprising: determining a set of cells having a spatially overlapping coverage area in a sector, wherein the set of cells comprises at least a first cell and a second cell; determining a maximum total radiation level for the sector; determining a priority of each cell in the set of cells such that the first cell is prioritized over the second cell; and allocating, on the basis of the maximum total radiation level and said priorities, to each cell in the set of cells a parameter indicating a maximum radiation level in the respective cell, wherein said allocating is performed such that a smaller power reduction from a maximum transmission power is allowed for the first cell than for the second cell.

LIST OF DRAWINGS

Embodiments are described below, by way of example only, with reference to the accompanying drawings, in which FIGS. 1 and 2 illustrate a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
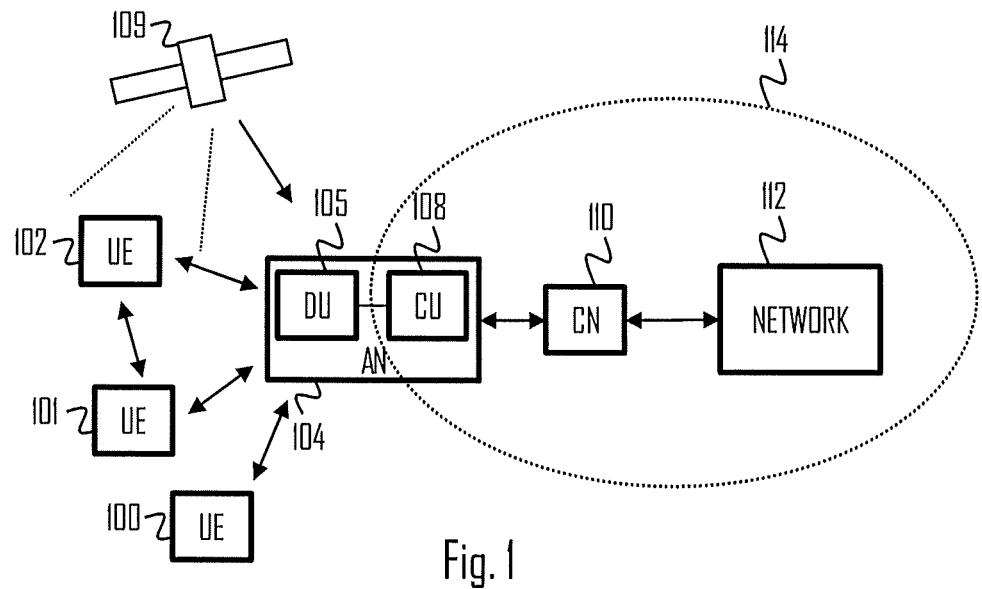

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g) NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, using beamforming and/or massive MIMO technologies, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, or future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Figure 2:
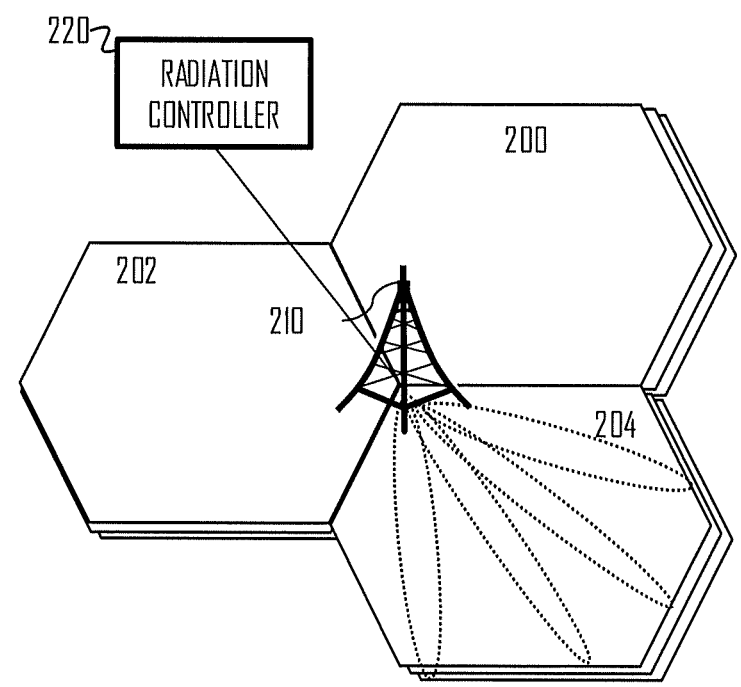

As described above, a modern cellular system comprising several cells covering the same spatial or geographical area. The cells may employ the same radio access technology (RAT), e.g. any one of the above-described RATs, or various RATs such as several 3GPP RATs and/or several RATs specified in other forums such as IEEE. FIG. 2 illustrates the overlapping RATs in greater detail. A base station site 210 is illustrated at a centre of multiple sectors 200, 202, 204 (hexagonal in this illustration) disposed around the base station site. A sector may be defined as a geographical area where multiple overlapping cells are provided. The sector may be omnidirectional with respect to the base station site 210, or the sector may be to a certain direction from the base station site 210. With the use of directive antennas, this concept is currently more suitable than a basic concept where the base station site is at the centre of a hexagonal cell. Multiple cells may provide coverage within each sector 200 to 204, wherein the cells may be provided according to the various RATs. Some cells in the same sector may support the same RAT but on different frequencies. An example of such a situation is where a primary cell and a secondary cell of the same RAT is provided in the same sector for improved capacity and/or coverage (e.g. a hotspot). With the use of highly directive beamforming techniques, the cell may be covered by a plurality of radio beams directed to different directions from the base station site, thus providing a combined coverage that covers the cell. Different beams may be transmitted with different transmission power levels, beams indicated by dotted lining on the sector 204, thus causing different levels of radiation in different segments of the cell and the sector.

Figure 3:
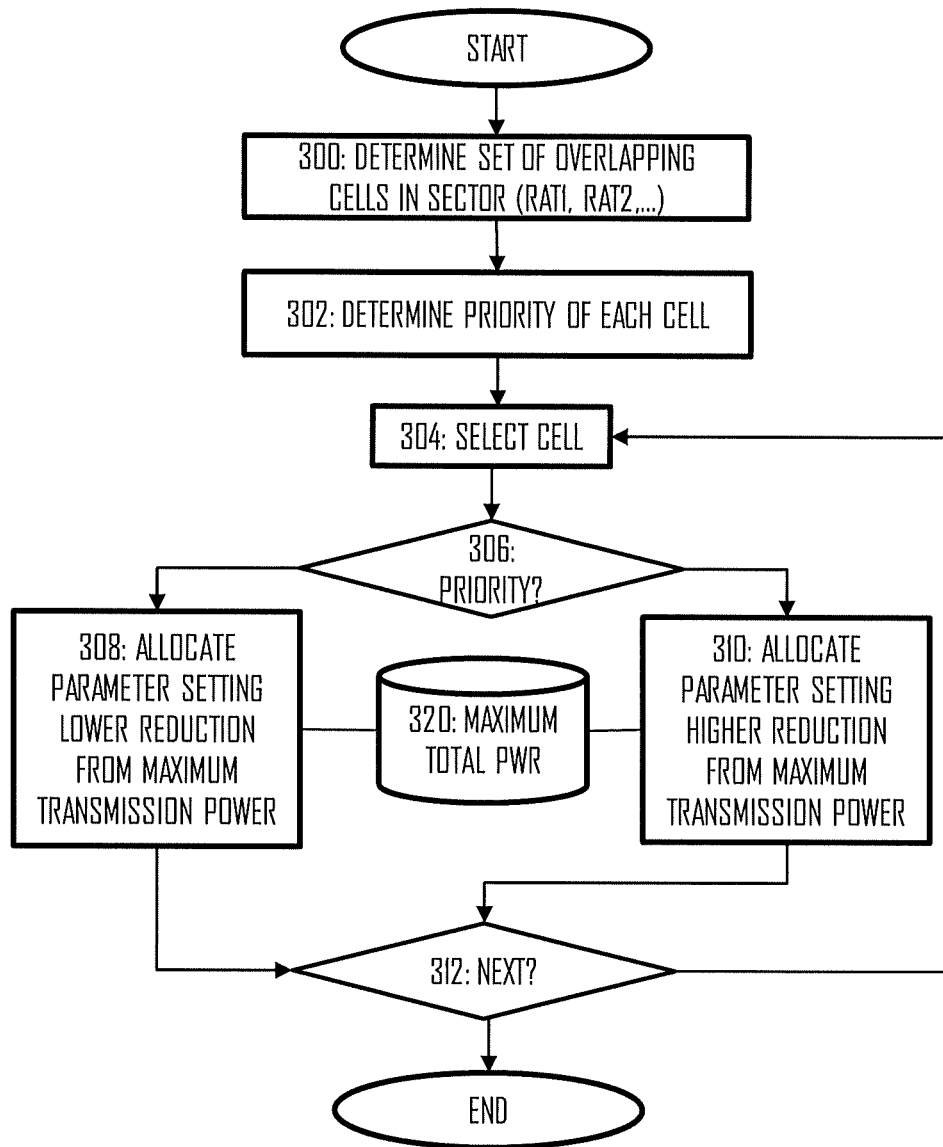
FIG. 3 illustrates a process for controlling maximum radiation levels in cells according to an embodiment.

As described in Background, there are regulatory limits to the maximum radiation level in a spatial area, and an operator of the cellular communication system is bound to ensure that the maximum radiation level is not exceeded in the coverage area of the cellular communication system. The operator may run a computer-implemented solution for controlling the radiation levels in the cells on the basis of radiation measurements in the cells. The radiation level per cell may be measured from a transmission power of a radio transmitter in each cell. In the following description, the focus is on the transmissions of the access nodes in the cells. With the knowledge of the transmission power level in each cell, a direct mapping to the radiation level may be performed to acquire information on the current radiation levels in the cells and in each sector. The method may also be used to distribute the available radiation 'resources' to the cells. FIG. 3 illustrates an embodiment of a computer-implemented method for controlling radio emissions in cells of a sector, e.g. any one of the sectors 200 to 204. The method may be performed by a radiation controller 220 coupled to the access nodes of the cellular communication system to control the radiation levels of the access nodes.

Referring to FIG. 3, the computer-implemented process comprises: determining (block 300) a set of cells having a spatially overlapping coverage area in a sector, wherein the set of cells comprises at least a first cell and a second cell; determining a maximum total radiation level 320 for the sector; determining (block 302) a priority of each cell in the set of cells such that the first cell is prioritized over the second cell; and allocating (blocks 304 to 312), on the basis of the maximum total radiation level and said priorities, to each cell in the set of cells a parameter indicating a maximum radiation level in the respective cell, wherein said allocating is performed such that a smaller power reduction from a maximum transmission power is allowed for the first cell than for the second cell.

The method of FIG. 3 is useful in that the regulatory limits are met with the appropriate control while maintaining the performance of the wireless access services provided in the sector, e.g. high quality of experience, coverage or another characteristic that forms the basis for the prioritization of the cells.

Let us describe the allocation in greater detail with reference to FIG. 3. Upon determining the priorities of the cells in the sector, the allocation may be performed. Each cell may be assigned with the parameter that defines the maximum allowed radiation in terms of the transmission power. In an embodiment, the parameter is a power reduction factor ($F_{PR}$) that reduces the maximum transmission power of a cell. The power reduction factor may be applied to limit the maximum power of the cell so that an actual transmission power is controlled under limitations set by the power reduction factor. The power reduction factor may be applied by the access node managing the cell to reduce the maximum transmission power of the cell by the amount defined by the power reduction factor. A true maximum transmission power may be defined as the maximum power that a radio transmitter used by the access node for the cell is capable of transmitting. The access node may then configure a maximum limited transmission power that may be defined as a maximum transmission power the operator has configured for the cell. This may be the same as or lower than the maximum true maximum transmission power. The reason for the difference may be adjusting the coverage area of the cell in order to reduce interference towards neighbouring cells, for example. The power reduction factor may then be applied to the maximum limited transmission power to define a transmission power with which the cell is allowed to radiate. If the power reduction factor is set to 0 dB, the cell can transmit up to 100% of its maximum limited transmission power. If the power reduction factor is configured to −3 dB, the cell is allowed to transmit only up to 50% of its maximum limited transmission power, and so on. Another definition of the power reduction factor is a multiplication factor that is applied to a time-averaged maximum transmission power in order to obtain its actual maximum value from its cumulative distribution function. An actual transmission power in the cell may then vary below the maximum limited transmission power reduced by the power reduction factor.

The access node managing the cell may use the parameter to define a ceiling to the transmission power and then perform the transmissions in the cell by such that the ceiling will not be exceeded. Conventionally, the power reduction factor is defined in decibels (dB) with respect to the maximum transmission power. In block 304, the first cell of the set of cells is selected, and its priority level is determined in block 306. The parameter may be assigned on the basis of the priority according to the above-described principle. Accordingly, if the priority is high, a higher maximum transmission power (lower power reduction factor) may be allowed to the cell (block 308). On the other hand, if the priority is low, a lower maximum transmission power (higher power reduction factor) may be assigned to the cell (block 310). The actual value of the parameter specifying the maximum transmission power is thus bound to the priority level, and the actual correlation between the different priority levels and the values of the parameter may depend on the design. Some embodiments are described below. Upon allocating the parameter value to the cell, the process may proceed to block 312 where it is determined whether or not all the cells have been assigned with the parameter value. If there is at least one cell not yet assigned with the parameter value, the process may return to block 304 for selection of the next cell. Otherwise, the process may end.

The priority may be understood as ordering the cells into a certain order according to a criterion that indicates importance of the cells from a certain perspective. This order may then be used in the allocation of the parameters defining the maximum allowed radiation levels in the cells.

In an embodiment, the prioritization is based on the radio access technology such that the first radio access technology providing a higher quality-of-experience of quality-of-service is prioritized over the second radio access technology providing a lower quality-of-experience of quality-of-service. Accordingly, the first cell may operate according to the first radio access technology while the second cell operates according to the second radio access technology. The quality-of-experience (QoE) and quality-of-service (QoS) may be defined in terms of the characteristics of the cellular access services provided by the cell. Conventionally, a more developed evolution version provides a higher QoE and QoS than an older evolution version. Accordingly, a cell providing 5G access may be prioritized over a cell providing an LTE or 3G access. Characteristics affecting the QoS typically include data throughput capacity, latency on lower protocol layers (e.g. on or below network layer), a number of failures, etc. Characteristics affecting the QoE is access to services such as a mobile broadband service for a certain application such as high-definition video streaming, operation of such services from the user perspective (typically proportional to an effective data rate) and user-level latencies (how long user has to wait for the start of video playback).

In an embodiment, the set of cells comprises at least one primary cell of the first radio access technology and at least one secondary cell of the first radio access technology, and wherein the at least one primary cell is prioritized over the at least one secondary cell. A primary cell may be a macro cell providing a larger coverage area than the secondary cell. The secondary cell may be a micro or pico cell that provides a hotspot within the coverage area of the primary cell. Accordingly, the prioritization may ensure that primary cells are provided sufficient headroom for the radiation to ensure that there are no outage problems in the cellular network. The primary and secondary cell may support the same RAT.

Another embodiment combines the embodiments of the two paragraphs above. Accordingly, one level of prioritization may be the RAT while another is the order of the cell (primary, secondary, etc.). Accordingly, the priority order in the decreasing order of priority may be as follows: a primary cell of the first RAT, a primary cell of the second RAT, a secondary cell of the first RAT, and a secondary cell of the second RAT. Accordingly, the prioritization may ensure that all RATs are provided with a sufficient headroom for the radiation (transmission power). The secondary cells may have more limited headroom as defined in the order of priority. It should be appreciated that the cells may have unique transmission power capabilities so the actual radiation levels may differ for each cells even significantly. For example, even if the secondary cell of the first RAT was prioritized over the primary cell of the second RAT by assigning a lower power reduction factor to it, the primary cell would probably still transmit a higher transmission power and have a higher radiation level because of a wider coverage area and greater transmission power capabilities.

Yet another embodiment uses an operating frequency as a criterion for the prioritization. This may be related to the prioritization based on the primary, secondary, etc. nature of the cells in a case where different cells operate on different operating frequencies in the sector.

In an embodiment, the current radiation level of each cell in the sector is collected, e.g. from the access node(s) managing the set of cells and said allocating is performed further on the basis of the current radiation level of said each cell. The current radiation level may be used to determine the total radiation in the sector for comparison with the maximum total radiation level allowed to the sector. The maximum total radiation level may be set by the regulatory limit described above. Accordingly, information on the current state of the radiations in the sector may be acquired and it may be decided whether or not there is further headroom to the maximum total radiation level available. If there is headroom, the radiation controller may adjust the parameter values according to the process of FIG. 4. If there is no headroom available and, instead, the measurements show that the radiations are above the maximum total radiation level, the radiation controller may use the process of FIG. 4 to reduce the parameter value and the radiation levels in the cells. If the measured radiations are found to be substantially at the maximum total radiation level, the radiation controller may use the process of FIG. 5 to rebalance the cell-level allowed radiation levels.

In a situation where a cell comprises a plurality of segments, with different measured radiation levels as described above in connection with FIG. 2, the current radiation level per segment may be determined and, as the current radiation level for said cell, a current radiation level of a segment having the highest radiation level in the cell may be selected. This is more feasible than the summed radiation levels of the segments because the segments are spatially separated.

In an embodiment, the radiation levels may be measured over a long time interval. The time interval may be one day, one week, one month, or even longer. The time interval may be at least multiple hours to acquire statistical significance. The current radiation level may be represented in the form of a distribution function, e.g. a cumulative distribution function. The cumulative distribution function may sort the measured radiation levels of the cell in an increasing or decreasing order. The radiation controller may determine, on the basis of the cumulative distribution function, a threshold level that specifies a minimum target level for the power reduction factor. The threshold level may be set to a level that is associated with a determined percentile of the cumulative distribution function, e.g. a $100^{th}$ percentile, $99^{th}$ percentile, or $97^{th}$ percentile. The percentile X may be understood such that X percent of the measured radiation levels stay below the threshold level. In other embodiments, the threshold level may be set manually or automatically according to another logic, e.g. as determined by an operator of the cellular communication system. This threshold level may be used as a lower bound to how much the maximum radiation level can be reduced for a cell. Since the measurements and the cumulative distribution function is provided per cell, a different threshold level may be specified for each cell.

Figure 4:
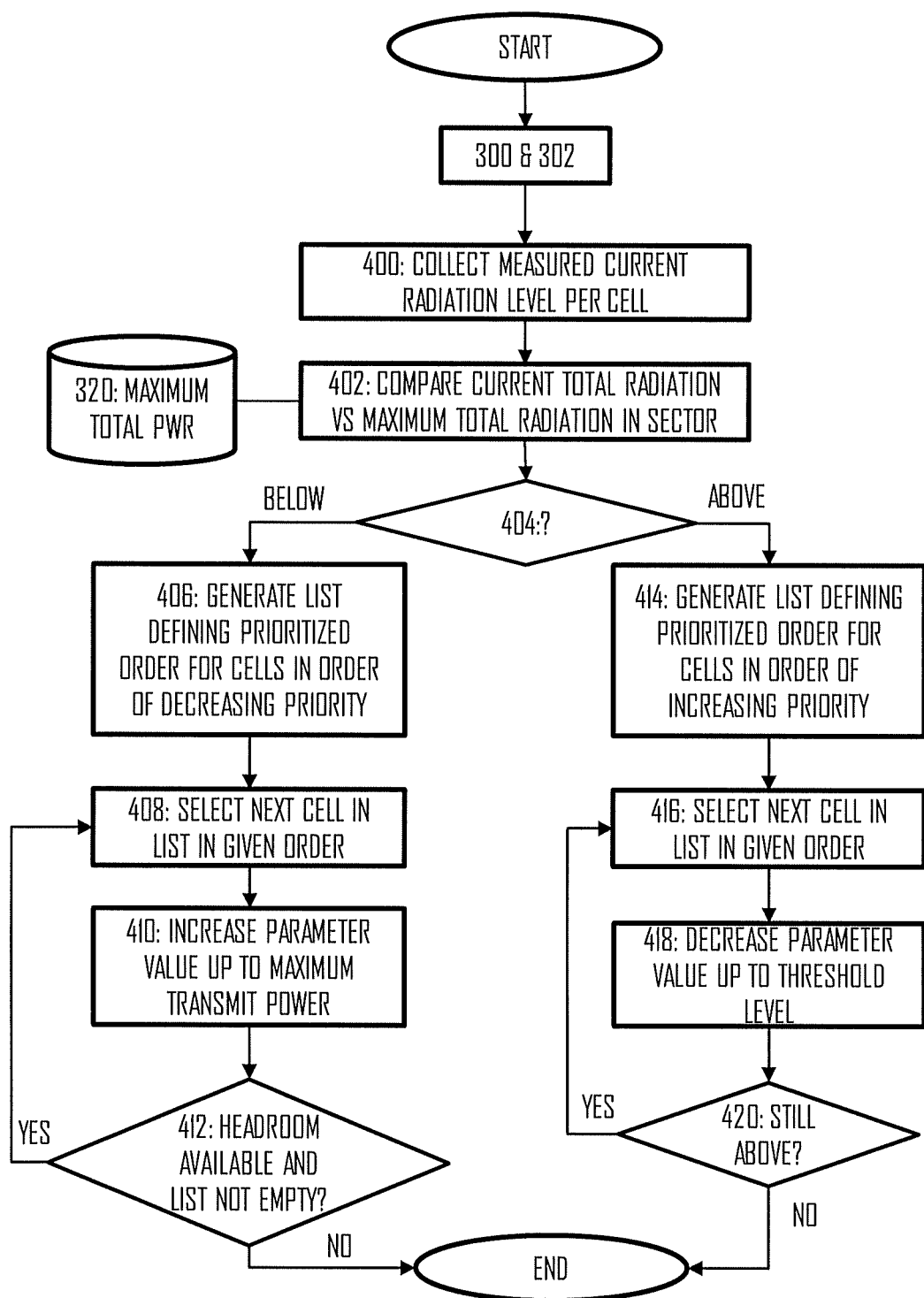
FIG. 4 illustrates an embodiment of a process for controlling radiation levels within a headroom to a maximum total radiation level for a sector.

Now, let us describe the procedure of FIG. 4 that is an embodiment of the process of FIG. 3. Referring to FIG. 4, blocks 300 and 302 may be carried out in the above-described manner. In block 400, the radiation controller may collect the measurement data indicating the current radiation levels in each cell of the sector. Block 400 may include computing the cumulative distribution function and the threshold levels for each cell and, optionally, for the sector. Block 400 may also include computing the current total radiation level in the sector. The current total radiation level of the sector may then be compared with the maximum total radiation level 320 to determine whether or not the regulatory limit set by the maximum total radiation level has been obeyed. For the purpose of this comparison a determined percentile of the cumulative distribution function of the cell may be selected, e.g. any one of the above-described percentiles. In block 404, it is determined whether the current total radiation level of the sector is above or below the maximum total radiation level. The comparison may include comparison with one or two thresholds. One threshold may be used to determine either of the two possibilities. When using the two thresholds, a region between the thresholds may indicate that the current total radiation level is substantially at the level of the maximum total radiation level. In such a case, the procedure of FIG. 5 may be used to perform rebalancing of the parameter values between the cells.

If the current total radiation level is below the maximum total radiation level, the radiation controller may determine that there is a headroom between the current total radiation level and the maximum total radiation level, and allocate the headroom to the cells in the set of cells according to the determined current radiation levels and the prioritization. In other words, the radiation controller may adjust the parameters of the cells according to the new allocation. Blocks 406 to 412 represent this embodiment. In block 406, the radiation controller may generate a list comprising the cells in the order of decreasing priority. The cell having the highest priority may be first in the list while the cell having the lowest priority may be the last in the list. Then, the first cell in the list (the highest priority cell) is selected in block 408 and its parameter value defining the maximum radiation level (maximum transmission power) for the cell is changed so that the maximum radiation level for the cell is increased in block 410. An upper limit for the increase may be either the maximum total radiation level or the maximum limited transmission power of the cell whichever is reached first. Upon reaching the upper limit, the cell may be removed from the list and headroom to the maximum total radiation level may be reduced by the increase performed in block 410. Then, the process may proceed to block 412 where it is determined whether or not there is still headroom to the maximum total radiation level and whether or not the list is not already empty. If there is still headroom available and the list is not empty, the process returns to block 408 and the next cell in the list is selected. Accordingly, the parameter values are increased until either the list is empty or the headroom is used and, then, the process may end.

If the current total radiation level is above the maximum total radiation level in block 404, the radiation controller may determine that there is a negative headroom between the current total radiation level and the maximum total radiation level, and reduce the maximum radiation level of the cells according to the prioritization. In other words, the radiation controller may adjust the parameters of the cells according to thus-acquired new allocation of the parameters. Blocks 414 to 420 represent this embodiment. In block 414, the radiation controller may generate a list comprising the cells in the order of increasing priority. The cell having the lowest priority may be first in the list while the cell having the highest priority may be the last in the list. Then, the first cell in the list (the lowest priority cell) is selected in block 416 and its parameter value defining the maximum radiation level (maximum transmission power) for the cell is changed so that the maximum radiation level for the cell is decreased in block 418. A lower limit for the decrease may be the threshold level (the minimum target level) described above or the maximum total radiation level whichever is reached first. Upon reaching the lower limit, the cell may be removed from the list and the negative headroom to the maximum total radiation level may be reduced by the decrease performed in block 418. Then, the process may proceed to block 420 where it is determined whether or not there is still negative headroom to the maximum total radiation level remaining. If there is still negative headroom, the process returns to block 416 and the next cell in the list is selected. Accordingly, the parameter values are decreased until either the list is empty or the negative headroom is removed and, then, the process may end. If the list is empty before the negative headroom has been removed, the radiation controller may redefine at least some of the thresholds to a lower level. Then, blocks 414 to 420 may be repeated.

In this manner, the radiation controller may find appropriate levels for the maximum radiation in each cell such that the performance of the cells is kept high by assigning higher transmission power limitations to lower priority cells and lower transmission power limitations to a higher priority cells.

In an embodiment, the current radiation level of the cells used in the embodiments described herein is measured effective isotropic radiated power (EIRP) or effective radiated power (ERP). ERP is an IEEE standardized definition of radio frequency (RF) power radiated by a radio transmitter, for example. ERP indicates both actual radiated power and directivity of the radiated power in a particular direction. The ERP may be understood as an input power to the antenna multiplied by the gain of the antenna, by which the radio transmitter is capable of measuring the EIRP by measuring its transmission power. The EIRP is a hypothetical power that would have to be radiated by an isotropic antenna to give equivalent signal strength as the actual source antenna in the direction of the antenna's strongest beam. The difference between EIRP and ERP is that ERP compares the actual antenna to a half-wave dipole antenna, while EIRP compares the actual antenna to a theoretical isotropic antenna. There is a direct correlation between the ERP and the EIRP via a gain of 1.64 (2.15 dB) of the half-wave dipole antenna compared with the isotropic antenna.

Figure 5:
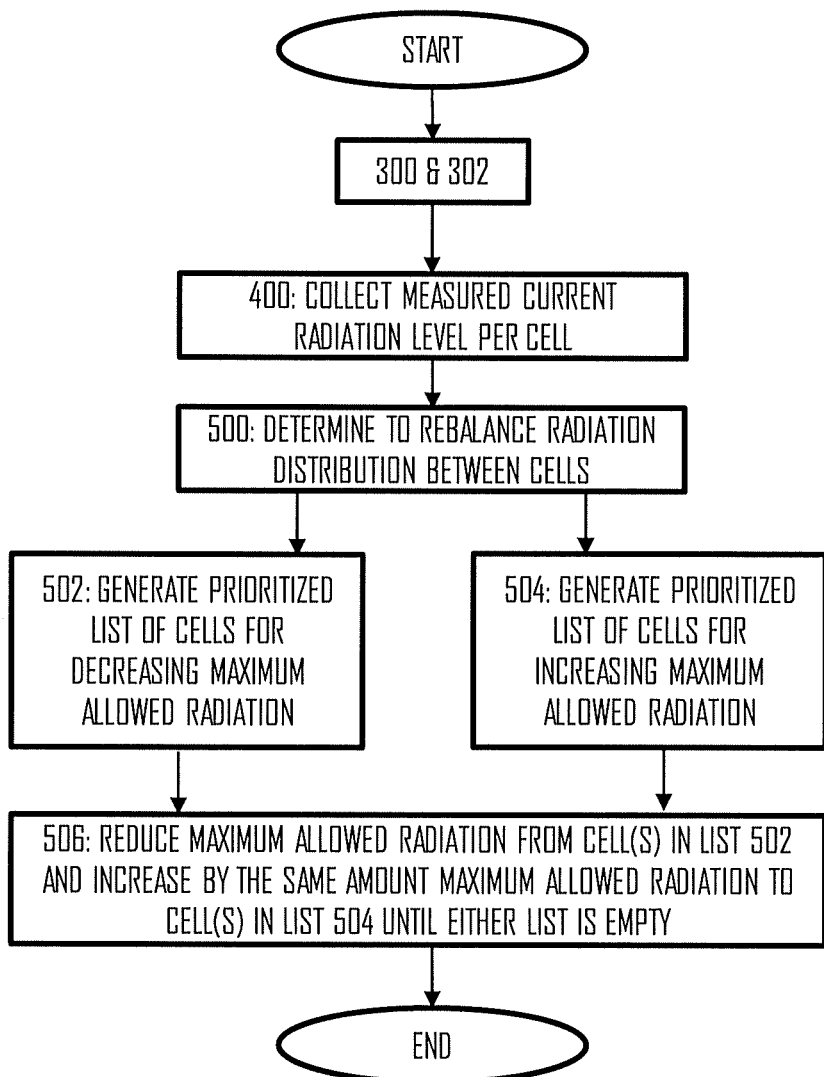
FIG. 5 illustrates an embodiment of a process for rebalancing maximum radiation levels in cells of a sector.

In an embodiment, the radiation controller allocates the maximum total radiation level to the cells in the set of cells when allocating the parameters, and rebalances the allocation of the maximum total radiation level amongst the cells in the set of cells by changing the parameter of at least two cells in the set of cells. This may be carried out in connection with the process of FIG. 4, thereafter, or as an independent process. An embodiment of this rebalancing is illustrated in the flow diagram of FIG. 5. Referring to FIG. 5, blocks 300, 302, and 400 may be carried out in the above-described manner. In block 500, the radiation controller detects a need to rebalance the allocation of the parameters defining the maximum radiation levels for the cells. The need may be detected on the basis of the operation of the cells or their performance. For example, there may have been a change in the need for specific RATs, or a secondary cell may have been observed to route less traffic, or another change in the operating conditions of the cells in the sector.

In response to the detection, the radiation controller then generates in block 502 a list of cells for which the maximum allowed radiation shall be decreased. The list may be generated on the basis of the measured current radiation levels determined in block 400. For example, if the cumulative distribution function for a cell shows the current radiation level of the cell has been significantly below the maximum allowed radiation level allocated to the cell, the cell may be added to the list of block 502. In other words, the headroom may be allocated to another cell that would need a higher maximum allowed radiation level. The determination when the current radiation level of the cell has been significantly below the maximum allowed radiation level may be made on the basis of the cumulative distribution function, for example by determining a measured radiation level representing the determined percentile and comparing the determined measured radiation level with the maximum allowed radiation level. If there is a difference by at least a determined amount (may be configurable), it may be determined that there is radiation headroom available. The list may be a prioritized similarly to block 414, where the lowest priority cells are first on the list.

Further in response to the detection, the radiation controller generates in block 504 a list of cells for which the maximum allowed radiation shall be increased. The list may be generated on the basis of the measured current radiation levels determined in block 400. For example, if the cumulative distribution function for a cell shows the current radiation level of the cell has been at the maximum allowed radiation level allocated to the cell, the cell may be added to the list of block 504. In other words, the headroom of another cell would be allocated to the cell that needs the higher maximum allowed radiation level. The determination when the current radiation level of the cell has been at the maximum allowed radiation level may be made on the basis of the cumulative distribution function, for example by determining a measured radiation level representing the determined percentile and comparing the determined measured radiation level with the maximum allowed radiation level. If there is a difference by less than a determined amount (may be configurable and/or may be the same amount as in block 502), it may be determined that headroom is required for the cell. The list may be a prioritized similarly to block 406, where the highest priority cells are first on the list.

Upon completing the lists in blocks 502 and 504, the radiation controller may perform the rebalancing of the maximum allowed radiation levels between the cells of the sector in block 506. The radiation controller may pick the first cell from the list generated in block 502 and the first cell from the list generated in block 504, and reduce the power reduction factor (the maximum allowed radiation level) of the cell picked from the list of block 502 and increase the power reduction factor (the maximum allowed radiation level) of the cell picked from the list of block 504. As described above, there may be a lower limit for the power reduction factor for the cells in the list of block 502 and an upper limit for the power reduction factor for the cells in the list of block 504. Thresholds defining the lower limit and the upper limit per cell may be determined on the basis of the priority in the same manner as described above in connection with FIG. 4. As a consequence, the radiation controller may increase the power reduction factor of the cell picked from the list of block 504 up to the upper limit and reduce the power reduction factor from the cell picked from the list of block 502 by the same amount. If the lower limit is reached before reaching the upper limit, the radiation controller may remove the cell from the list of block 502 and select the next cell in the list. When the upper limit is reached, the radiation controller may remove the cell from the list of block 504 and select the next cell in the list. In this manner, the process may proceed until either list (or both) is empty. Since the radiation limits are only transferred between the cells, the change does not affect the total radiation level in the sector. Upon performing the rebalancing, the respective power reduction factors or corresponding parameters may be applied to the cells.

It should be appreciated that the rebalancing may also be made in connection with FIG. 4. For example, if there is the headroom to the maximum total radiation level in the sector, the radiation controller may reduce the maximum transmit power of at least one of the cells in the sector to carry out the rebalancing. Similarly, if there is the negative headroom to the maximum total radiation level in the sector, the radiation controller may increase the maximum transmit power of at least one of the cells in the sector to carry out the rebalancing.

Figure 6:
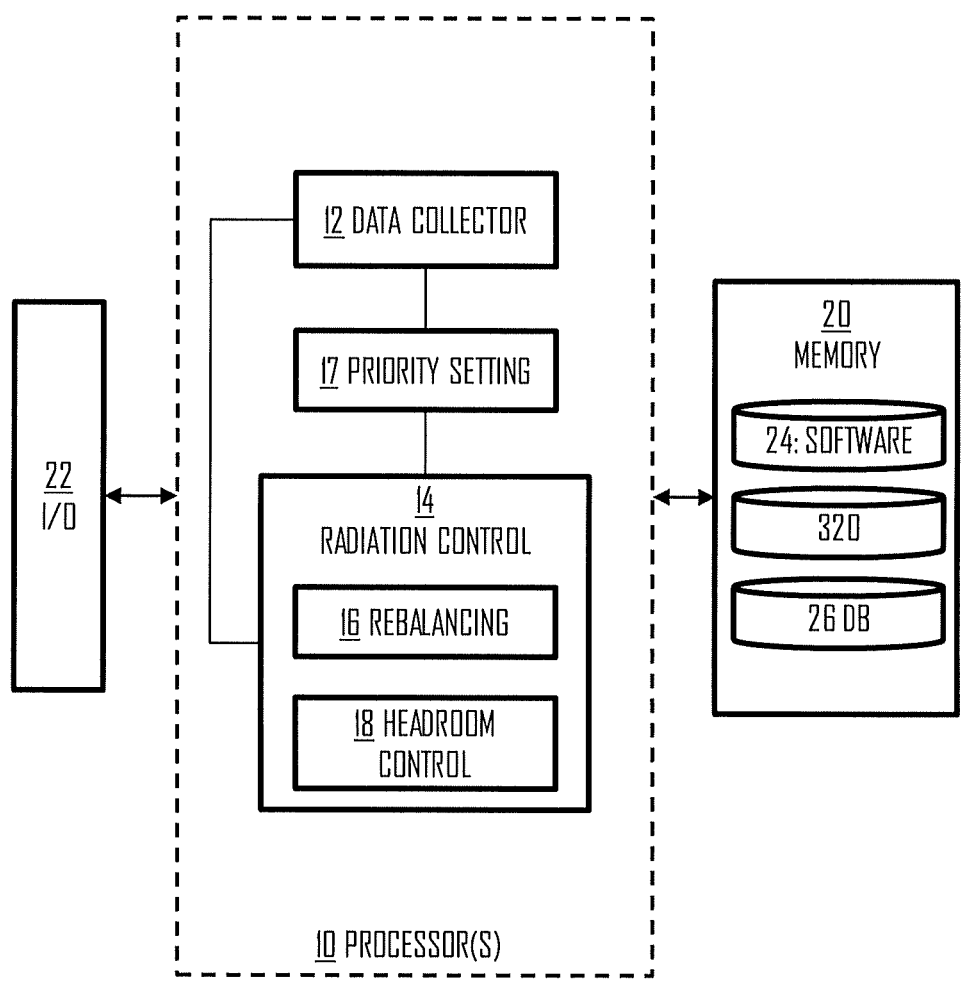
FIG. 6 illustrates a block diagram of a structure of an apparatus according to an embodiment.

FIG. 6 illustrates an apparatus comprising means for carrying out the process of FIG. 3 or any one of the embodiments described above. The apparatus may comprise at least one processor 10 and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the radiation controller 220 comprised in a network infrastructure of the cellular communication system. The apparatus may be a circuitry or an electronic device realizing some embodiments of the invention in the radiation controller. The apparatus carrying out the above-described functionalities may thus be comprised in the radiation controller, e.g. the apparatus may comprise a circuitry such as a chip, a chipset, a processor, a micro controller, or a combination of such circuitries for the radiation controller. The radiation controller may be a part of an operation and maintenance (O&M) controller, an entity of a self-organizing network (SON), a radio access network intelligent controller (RIC), or another entity that controls the operational parameters of the cellular network.

The memory 20 may be implemented using any suitable data storage technology, such as semiconductor-based memory devices, flash memory, magnetic memory devices and systems, optical memory devices and systems, fixed memory and removable memory. The memory 20 may comprise a database or a record for the maximum total radiation level 320 for the sector or for multiple sectors managed by the radiation controller. Furthermore, the at least one memory 20 may store a database 26 for other configuration parameters required for the radiation control, e.g. the priority levels of the cells per sector. The processor(s) may comprise, as sub-circuitries or sub-modules defined by physical circuits or combinations of the physical circuits and software 24, The at least one processor 10 may comprise a data collector 12 configured to collect the measured current radiation levels in the cells, as described above in connection with block 400. It may also build the cumulative distribution function described above. A priority setting circuitry 17 may be configured to set the priority of each cell in the sector, i.e. to perform any one of the blocks 302, 406 and 414, or 502 and 504. A radiation control circuitry 14 may then perform, on the basis of the priority levels and, in some embodiments, the measured current radiation levels, the allocation of the maximum allowed radiation levels per cell in the sector. The radiation control circuitry 14 may be configured to perform any blocks 304 to 312, for example. The radiation control circuitry may comprise headroom controller 18 configured to monitor the current radiation levels with respect to the maximum total radiation level and, upon detecting a positive or negative headroom, carry out the procedure of FIG. 4 to reallocate the maximum radiation levels per cell in the sector. The radiation control circuitry may comprise a rebalancing circuitry 16 configured to rebalance the maximum radiation levels in response to changed priority levels in the cells of a sector. The rebalancing circuitry may be configured to perform the process of FIG. 5 to reallocate the parameters defining the maximum radiation levels in the cells of the sector.

The apparatus may further comprise a communication interface 22 comprising hardware and/or software for providing the apparatus with communication capability with access nodes managing cells in the sector or sectors, as described above. The communication interface 22 may include hardware and software needed for realizing the communications over the required interface of the cellular communication system, e.g. according to specifications of an LTE or 5G interfaces.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3 or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:
1. An apparatus, comprising:
at least one processor; and
at least one non-transitory memory storing instructions, that when executed by the at least one processor, cause the apparatus to:
control radio transmission in cells of a cellular communication system by causing the apparatus to:

determine a set of cells having a spatially overlapping coverage area in a sector, wherein the set of cells comprises at least a first cell and a second cell;

determine a maximum total transmission power level for the sector;

determine a priority of each cell in the set of cells such that the first cell is prioritized over the second cell; and allocate, on the basis of the maximum total transmission power level and said priorities, to each cell in the set of cells a parameter indicating a maximum transmission power level in the respective cell, wherein the parameter is a multiplication factor applied to a time-averaged maximum transmission power in order to obtain its actual maximum value from its cumulative distribution function, and wherein said allocating is performed such that a smaller power reduction from a maximum transmission power is allowed for the first cell than for the second cell.

2. The apparatus of claim 1, wherein the at least one non-transitory memory is storing instructions executed by at least one processor, to cause the apparatus to:

determine a current transmission power level of each cell in the set of cells, and perform said allocating further on the basis of the current transmission power level of said each cell.

3. The apparatus of claim 2, wherein each cell in the set of cells comprises a plurality of segments, and wherein the at least one non-transitory memory is storing instructions executed by at least one processor, to cause the apparatus to:

determine the current transmission power level per segment and select, as the current transmission power level of each cell, a current transmission power level of a segment having the highest transmission power level in the respective cell.

4. The apparatus of claim 2, wherein the at least one non-transitory memory is storing instructions executed by at least one processor, to cause the apparatus to:

determine a headroom between a sum of the current transmission power levels and the maximum total transmission power level, to allocate the headroom to the cells in the set of cells according to the determined current transmission power levels and the prioritization, and adjust the parameters of the cells in the set of cells according to the allocation.

5. The apparatus of claim 2, wherein the current transmission power level is a measured effective radiated power, and wherein the parameter is a power reduction factor that reduces a maximum transmission power in a cell.

6. The apparatus of claim 1, wherein the at least one memory and computer program code are configured to, with the at least one processor, cause the apparatus to:

allocate the maximum total transmission power level to the cells in the set of cells when allocating the parameters, and rebalance the allocation of the maximum total transmission power level amongst the cells in the set of cells with changing the parameter of at least two cells in the set of cells.

7. The apparatus of claim 1, wherein the first cell is configured to operate according to a first radio access technology and the second cell is configured to operate according to a second radio access technology different from the first radio access technology, and wherein the prioritization is based on a radio access technology such that the first radio access technology providing a higher quality-of-experience or a higher quality-of-service is prioritized over the second radio access technology providing a lower quality-of-experience or a lower quality-of-service.

8. The apparatus of claim 1, wherein the first cell is a primary cell of the first radio access technology and the second cell is a secondary cell of the first radio access technology, and wherein the at least one primary cell is prioritized over the at least one secondary cell.

9. A computer-implemented method for controlling radio transmission in cells of a cellular communication system, comprising:

determining a set of cells having a spatially overlapping coverage area in a sector, wherein the set of cells comprises at least a first cell and a second cell;

determining a maximum total transmission power level for the sector;

determining a priority of each cell in the set of cells such that the first cell is prioritized over the second cell;

allocating, on the basis of the maximum total transmission power level and said priorities, to each cell in the set of cells a parameter indicating a maximum transmission power level in the respective cell, wherein the parameter is a multiplication factor applied to a time-averaged maximum transmission power in order to obtain its actual maximum value from its cumulative distribution function, and wherein said allocating is performed such that a smaller power reduction from a maximum transmission power is allowed for the first cell than for the second cell.

10. The computer-implemented method of claim 9, further comprising determining a current transmission power level of each cell in the set of cells and performing said allocating further on the basis of the current transmission power level of said each cell.

11. The computer-implemented method of claim 10, wherein each cell in the set of cells comprises a plurality of segments, the method further comprising determining the current transmission power level per segment and selecting, as the current transmission power level of each cell, a current transmission power level of a segment having the highest transmission power level in the respective cell.

12. The computer-implemented method of claim 9, further comprising determining a headroom between a sum of the current transmission power levels and the maximum total transmission power level, allocating the headroom to the cells in the set of cells according to the determined current transmission power levels and the prioritization, and adjusting the parameters of the cells in the set of cells according to the allocation.

13. The computer-implemented method of claim 9, wherein the current transmission power level is a measured effective radiated power, and wherein the parameter is a power reduction factor that reduces a maximum transmission power in a cell.

14. The computer-implemented method of claim 9, wherein the maximum total transmission power level is allocated to the cells in the set of cells when allocating the parameters, the method further comprising rebalancing the allocation of the maximum total transmission power level amongst the cells in the set of cells with changing the parameter of at least two cells in the set of cells.

15. A non-transitory computer-readable medium comprising a computer program code readable by a computer, wherein the computer program code configures the computer to carry out a computer process for controlling radio transmission in cells of a cellular communication system, comprising:

determining a set of cells having a spatially overlapping coverage area in a sector, wherein the set of cells comprises at least a first cell and a second cell;

determining a maximum total transmission power level for the sector;

determining a priority of each cell in the set of cells such that the first cell is prioritized over the second cell; and allocating, on the basis of the maximum total transmission power level and said priorities, to each cell in the set of cells a parameter indicating a maximum transmission power level in the respective cell, wherein the parameter is a multiplication factor applied to a time-averaged maximum transmission power in order to obtain its actual maximum value from its cumulative distribution function, and wherein said allocating is performed such that a smaller power reduction from a maximum transmission power is allowed for the first cell than for the second cell.

\* \* \* \* \*